SINGLE CHANNEL SINGLE FREQUENCY MOBILE RADIO TELEPHONE SYSTEM

Filed June 15, 1949 2 Sheets-Sheet 1

*INVENTOR.*
ROBERT P. DIMMER
*BY* Chas. Tu. Candy
ATTORNEY

Nov. 2, 1954 R. P. DIMMER 2,693,526

SINGLE CHANNEL SINGLE FREQUENCY MOBILE RADIO TELEPHONE SYSTEM

Filed June 15, 1949 2 Sheets-Sheet 2

INVENTOR.
ROBERT P. DIMMER

BY *Chas. W. Candy*

ATTORNEY

United States Patent Office 2,693,526

Patented Nov. 2, 1954

2,693,526

SINGLE CHANNEL SINGLE FREQUENCY MOBILE RADIO TELEPHONE SYSTEM

Robert P. Dimmer, Chicago, Ill., assignor to Automatic Electric Laboratories, Inc., Chicago, Ill., a corporation of Delaware Application June 15, 1949, Serial No. 99,312

7 Claims. (Cl. 250—6)

Figures 1, 2:
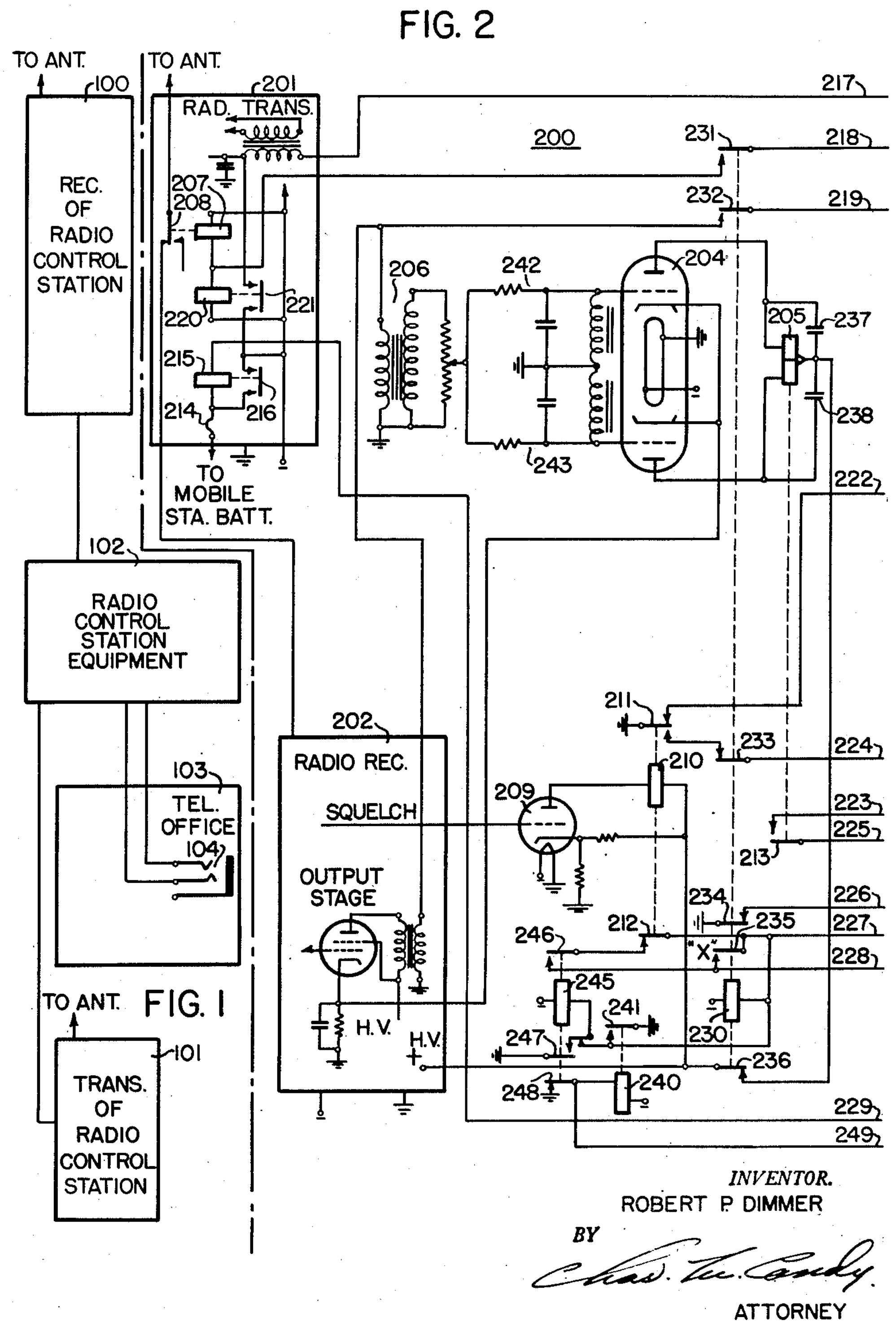

The present invention relates to telephone systems in general, and more particularly to radio telephone systems wherein radio transmitters and receivers are employed for establishing telephone connections between ordinary immobile stations of a telephone exchange system and mobile stations such as automobiles, boats and the like.

This application is a continuation-in-part of the application Serial No. 57,442 filed October 30, 1948 (now abandoned).

It is an object of the invention to provide a telephone system of the character described, in which system connections from the telephone office to the mobile stations are automatically established in a new and novel manner by the dialing of the regular directory numbers of the wanted mobile stations.

Another object of the invention is to provide in a telephone system of the character described, selective signalling and secret service between immobile and mobile stations in either direction over a single radio channel, and also between two mobile stations over the same radio channel.

A further object of the invention is to provide a simplified telephone system of the character described, wherein the dial impulses from the telephone office are received as two alternate frequencies of "splashes" of tone modulation of the incoming radio carrier to the radio receivers of the mobile stations, and are delivered from the radio receivers of the mobile stations as corresponding "splashes" of tone of the two alternate frequencies.

A still further object of the invention is to provide in a telephone system of the character described, new and novel means for translating received tone splashes of two alternate frequencies at each mobile station into direct current pulses for stepping the selectors of the mobile stations.

Another object of the invention is to provide in a telephone system of the character described, new and novel circuit means for establishing the various telephone connections.

A feature of the invention relates to the novel manner in which a single relay at each mobile station is pulsed responsive to received tone splashes of two alternate frequencies over the radio receiver of the mobile station.

Another feature of the invention concerns the novel use of a thermal relay at each mobile station tuned to the one radio channel, for preventing such mobile stations (excepting a called mobile station) from "eavesdropping" on an established connection to a called mobile station.

A further feature of the invention resides in the new and novel arrangement wherein the selector of a dialed mobile station is automatically restored to the normal home position shortly after the dialed mobile station is signalled.

A still further feature of the invention is the provision of novel means for automatically preventing stray pulses of certain character received over the radio receiver of a mobile station from causing false signalling of the mobile station.

Other objects and features will become apparent from the following specification together with the accompanying drawings which show a proposed embodiment by way of example.

Figure 3:
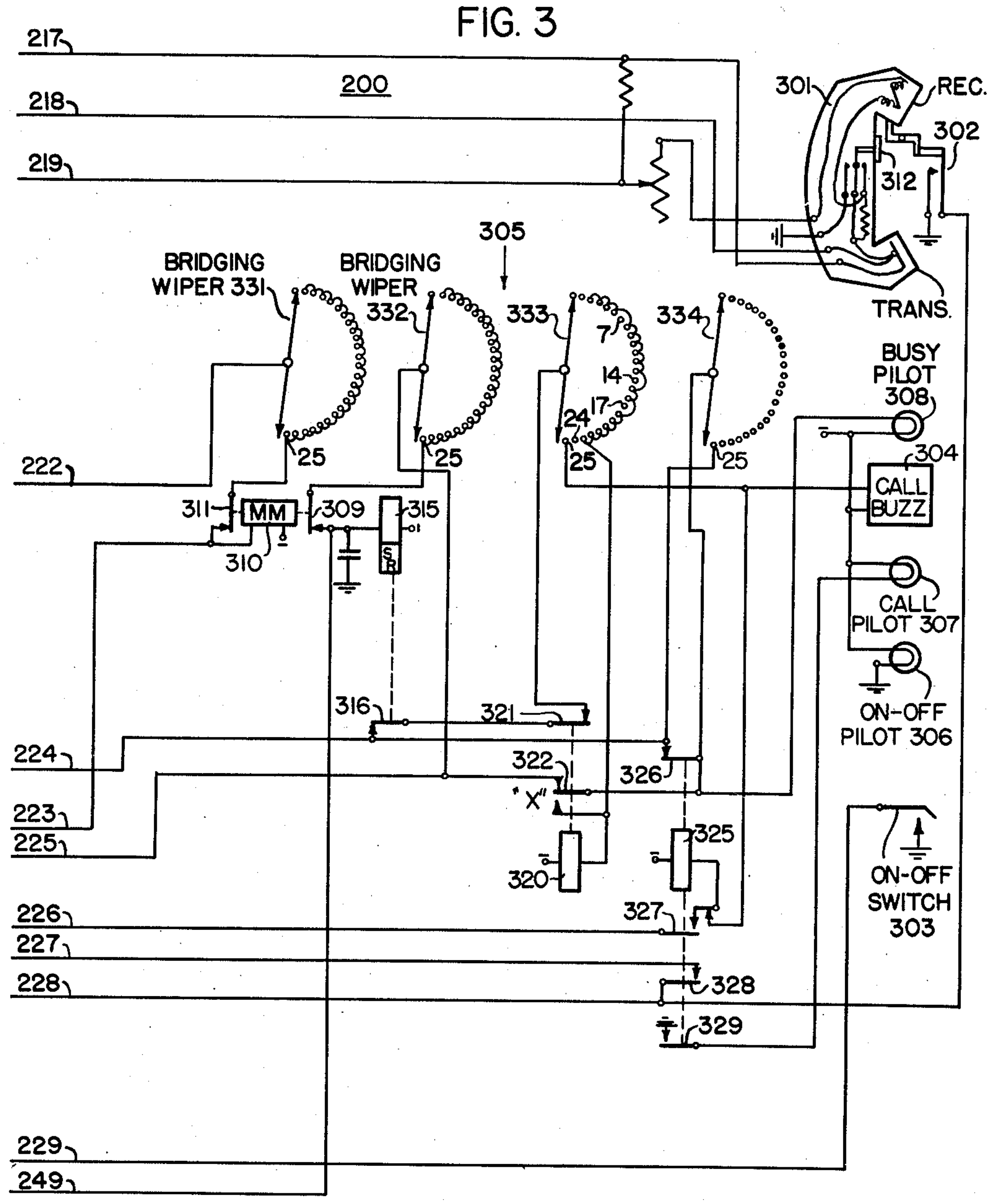

The invention is disclosed in two sheets of drawings comprising Figures 1, 2 and 3.

Figure 1 shows in "block" form the telephone office connected to the radio control station having a radio receiver and a radio transmitter.

Figures 2 and 3 when placed side by side show the equipment and arrangement of one of the mobile stations.

Referring to Figures 1, 2 and 3, a description of the equipment and arrangement of the various circuits will now be given.

*Telephone office equipment*

Reference character 103 in Figure 1 indicates a telephone office which is connected by a physical circuit of two wires to radio control station 102. The telephone office may be of any well-known system comprising a switchboard staffed by one or more operators and subscriber telephone stations physically connected to the switchboard, and it is, therefore, considered satisfactory for the purpose of this specification to indicate the telephone office equipment in block form.

The operator equipment comprises conventional toll position equipment including a dial for dialling the directory call numbers of the mobile stations tuned to the radio control station. It is, therefore, considered satisfactory to represent the operator equipment by a jack identified by the reference character 104.

*Radio control station*

Reference character 102 in Figure 1 indicates a radio control terminal connected to a radio receiver 100 and a radio transmitter 101. The control terminal may be the well-known Western Electric Company G–2 radio control terminal, or equivalent, and is connected to the toll operator jack 104 by means of a conventional radio control trunk circuit (not shown).

Radio transmitters, such as 201, of the mobile stations are tuned to a common channel with radio station receiver 100 which may be of any suitable well-known type. Radio station transmitter 101, which may be of any well-known type of radio transmitter suitable for the purpose, co-operates with radio receivers, such as 202, of the mobile stations over a common carrier channel.

Radio station transmitter 101, when placed on the air by the radio control terminal, radiates its carrier modulated by 600 cycle frequency tone. A selective-signalling oscillator (not shown) in radio control station 102 sends out alternate pulses of 600 and 1500 cycle frequency tones (corresponding to the impulses of the digits dialed by the tool operator) that cause the multiple operations of the station selectors of the mobile stations.

The method of operation of the radio control terminal together with the radio control circuit and pertinent circuit items of the toll operator positional equipment is explained in detail in publications issued by the manufacturer of the mentioned G–2 radio control terminal, to which publications reference may be had for details not included in this specification. It should, therefore, suffice for persons skilled in the art to state here that the toll operator extends calls from the telephone office to the mobile stations by dialing the directory call numbers of the wanted mobile stations, and that outgoing calls from the mobile stations are relayed by radio station reecive 100 through radio control terminal 102 to the toll operator equipment (represented by jack 104) where such calls are evidenced by the glowing of a call signal lamp (not shown).

The numerical part of each mobile station call number totals 23, and each such call number is divided into five digits. The bank level associated with wiper 333 of station selector 305 of each mobile station is wired in accordance with the call number of the particualr mobile station. For example, the call number of station 200 shown in Figures 2 and 3 is 57371 and, starting with contact #2 of wiper 333 bank level, the first digit "5" appears at contact #7 which is an open contact: the second digit "7" appears at contact #14 also an open contact: the third digit "3" appears at contact #17, an open contact: the fourth digit "7" appears at contact #24, an open contact: and the fifth digit "1" appears at contact #25 which is wired to call buzzer 304 and call lamp signal relay 325. It is, therefore, apparent that when station selector 305 has been pulsed responsive to the dialing of call number 57371 by the toll operator, wiper 333 has arrived at contact #25 of its bank level to cause station 200 to be signalled by the sounding of call buzzer 304 and the glowing of call pilot lamp 307. All other contacts of wiper 333 bank level, except contact #1, are multipled together and wired to relay 320, thereby to prevent wiper 333 from reaching contact #25 when a call number other than call number 57371 is dialed by the toll operator.

*Mobile stations*

Figures 2 and 3 show the arrangement and wiring of one of the mobile stations, and more specifically may be subdivided into dash control equipment shown to the right of Figure 3; radio transmitter 201 and radio receiver 202 shown to the left of Figure 2; transformer-coupled tuned tone receivers 242 and 243 shown in the upper center section of Figure 2; tone rectifier 204 and pulsing relay 205 shown to the right of Figure 2; and station selector 305 shown in the center section of Figure 3.

The dash control equipment comprises a telephone handset 301, a cradle switch 302 associated with handset 301, a master "on-off" switch 303; a call buzzer 304, and supervisory pilot lamps 306, 307 and 308. Lamp 306 glows as an indication that master switch 303 has been operated to place mobile station 200 in the standby condition: lamp 307 glows whenever an incoming call is received for the mobile station; and lamp 308 glows as an indication that the radio channel is in use (busy). Buzzer 304 serves as an audible signal on incoming calls to the mobile station.

The dash control equipment is mounted within easy reach and observation of the operator of the mobile station. The transmitter and receiver control equipment may be located in any convenient space in the mobile station which is accessible for inspection and adjustment of this equipment.

One antenna is provided for the alternate use of radio receiver 202 and radio transmitter 201. Radio receiver 202 is normally connected to the antenna through a break contact of TL relay 207 which, when operated, switches the antenna from receiver 202 to transmitter 201.

Radio receiver 202 may be of any suitable well-known type and is responsive to receipt of carrier wave from radio control station transmitter 101 to cause the operation of an associated squelch relay 210 for preparing the impulse receiver circuit. The output circuit of receiver 202 is coupled by means of transformer 206 to the two tuned tone receivers 242 and 243 whereby received tone impulses undergo impedance changes before reaching tone rectifier 204. Tuned receiver 242 is tuned to a frequency of approximately 1500 cycles, and tuned receiver 243 to a frequency of approximately 600 cycles. These two tuned receivers, therefore, accept only the frequency they are individually tuned to and reject all other frequencies. When a tone impulse of either specified frequency is detected, plate current flows in the section of tone rectifier 204 corresponding to that frequency (tube biased to cutoff with no signal), and when plate current flows in either section, pulse relay 205 operates.

Radio transmitter 201 may be of any suitable well-known type, is normally disconnected from the antenna, and is switched on and off the air by the operation and restoration of TL relay 207. Relay 207 is operated responsive to the pressing of TL button 312 in telephone handset 301, and is restored to normal when TL button 312 is released.

The radio transmitter circuit also includes a power relay 215, controlled by "on-off" switch 303, for activating transmitter 201 by connecting battery to the transmitter through contactor 216. The said transmitter responds instantly to the application of high voltage connected by said activation, to place the carrier of the mobile station on the air when TL relay 207 switches the transmitter to the antenna. The radio transmitter circuit further includes a second power relay 220, controlled by TL button 312, for supplying transmission battery to the transmitter of telephone handset 301.

Station selector 305 is mechanically similar to the well-known type of rotary lineswitch stepped by spring power released when the motor magnet of the switch restores, with the general differences that the selector is directively controlled from the normal home position by impulses to select certain contacts in its banks, and is automatically "homed" to the normal home position upon the release of the connection. Four bank levels of 25 contacts each, a motor magnet and several control relays are associated with station selector 305. It should be understood that the station selector may employ bank levels of more than 25 contacts each should it be so desired, and also that a rotary switch with off-normal contact springs and two bank levels can be substituted for the present switch with four levels of which two are related to the homing operation of the selector.

It should be further understood at this time that while a plurality of battery connections are shown in the drawings, they are preferably the same battery. It should also be understood that an "X" contact shown in association with a relay armature is a contact that makes or breaks before any other contacts of the particular relay are closed or opened, thus characterizing the relay as a two-step relay.

Having described the equipment and apparatus, a detailed description of the operation will now be given.

*Placing mobile stations in standby condition*

The mobile stations (such as 200) are maintained in a normal standby condition preparatory for use. Essentially, the standby condition involves maintaining the radio receivers such as 202, at the mobile stations in the fully operative state. The radio transmitters, such as 201, at the mobile stations utilize tubes of the filament quick-heating type thereby to reduce standby power requirements.

The mobile stations are placed in the standby condition by the operations of the respective master switches, such as 303, which operations cause power relays, such as 215, in the related radio transmitter to operate and connect battery potentials to the circuits of the related mobile stations.

The operation of master switch 303 completes a circuit to power relay 215 of radio transmitter 201 by way of conductor 229, fuse 214 and the battery of mobile station 200, causing power relay 215 to operate. At contactor 216, relay 215 extends battery to the various apparatus units of the station, including radio receiver 202 and radio transmitter 201. Radio receiver 202 is correspondingly placed in the fully operative state, in well-known manner, and "on-off" pilot lamp 306 glows as a visual indication to the operator of mobile station 200 that his station is in the standby condition. The application of battery to the other units of mobile station 200 places such units in a preparatory condition.

The restoration of master switch 303 disables mobile station 200 for use in connection with the radio channel, and "on-off" pilot lamp 306 becomes dark as a negative indication that mobile station 200 is "out of service."

*Incoming call to a mobile station*

On an incoming call to a mobile station from a calling telephone office station, the operator at the telephone office obtains the number of the wanted mobile station in well-known conventional manner. Next, the operator plugs into jack 104 associated with the radio channel thereby causing radio transmitter 101 of the radio control station to place its carrier modulated by 600 cycle frequency tone on the air. Reception of the carrier of transmitter 101 simultaneously by the radio receivers of all mobile stations in the standby condition causes the operations of the related squelch relays, such as 210 (Figure 2), in the following manner.

Upon receipt of the incoming carrier, radio receiver 202 causes the activation of tube 209 in well-known manner and thereby causes plate current to flow through squelch relay 210. Relay 210 accordingly operates and, at armature 212, opens a point in the operating circuit of relay 230, thereby to lock out station 200 for the time being. At armature 211 and working contact, relay 210 completes a circuit to busy pilot lamp 308 by way of armature 233, conductor 224, armature 326, lamp 308 to battery, causing lamp 308 to glow as an indication that the radio channel is occupied (busy).

The receipt of the incoming carrier modulated by 600 cycle frequency tone at radio receiver 202 causes pulsing relay 205 to operate through its lower winding in the manner to be explained elsewhere in this specification. This operation of relay 205 completes a circuit to motor magnet 310 from ground, armature 211 and working contact, armature 233, conductor 224, armature 326, armature 322 and resting contact, conductor 225, armature 213, conductor 223, winding of magnet 310 to battery, causing magnet 310 to operate. The operation of magnet 310 causes the positioning of its pawl in well-known manner preparatory to stepping the wipers of station selector 305.

Shortly following the first appearance of steady 600 cycle frequency tone on the carrier of transmitter 101 (accomplished when the operator plugged into jack 104), the 600 cycle frequency tone is automatically replaced by the 1500 cycle frequency tone. It should be understood at this time that there is a slight overlap of the two tones in the alternate switching of these two tones on the carrier. This is due to the facts that both tones are generated continuously and that the switching is accomplished by correspondingly short-circuiting the output circuits of the two tones alternately; and hence, the short-circuit on the inactive tone is removed (opened) and then placed (closed) on the active tone.

The first slight overlap of the two tones (as outlined in the preceding paragraph) causes a "kick down" restoration of pulsing relay 205 which in turn causes magnet 310 of station selector 305 to restore. This restoration of magnet 310 causes the wipers of selector 305 to be stepped from contacts #1 of the respective bank levels to contacts #2. Then as the short-circuit on the 600 cycle frequency tone takes effect and thereby removes the 600 cycle frequency tone from the carrier, the steady flow of the 1500 cycle frequency tone causes pulsing relay 205 to re-operate and again operate magnet 310. The stepping of the wipers of selector 305 to the respective bank contacts #2 places the wipers of selector 305 in position to be stepped responsive to the dialing of the telephone number of the wanted mobile station by the operator at the telephone office.

Immediately following the stepping of the wipers of selector 305 to the respective bank contacts #2, the equipment at radio control station 102 causes, in well-known manner, supervision to be given to the waiting operator at the telephone office as a signal to commence dialing. Accordingly, the operator then dials the telephone number of the wanted mobile station. The dial impulses are automatically translated into alternative tone modulation "splashes" of 600 and 1500 cycle frequencies on the carrier of transmitter 101 in well-known manner. The tone modulation on the transmitter carrier at the end of each dialed digit is either 600 or 1500 cycle frequency depending upon whether the digit was of odd or even value. The tone modulation on the transmitter carrier after the dialing of a digit remains on the carrier until the dialing of the next digit or, in the case of the final dialed digit, until the operator restores the dial connecting key or otherwise disables the dialing circuit.

The received tone "splashes" over radio receivers, such as receiver 202, are converted into multiple operations of the "line" relays, such as 205, of the mobile stations in the standby condition, starting the train of selector operations to be described later in this specification, and culminating in either non-response of the called mobile station or the appearance of the called mobile station's carrier on the air should the called mobile station answer the call. Should there be no answer to the call, the calling person abandons the call and thereby removes the received carrier from the mobile station radio receivers, such as 202, and the resulting restorations of the squelch relays, such as 210, unlock the related stations.

Should the called mobile station respond to the call, the lifting of the telephone handset, such as 301, causes the carrier of the related radio transmitter, such as 201, to be placed on the air in acknowledgement. Conversation between the calling station and called mobile station now takes place. It should be understood at this time that the completion of the operation of the station selector, such as 305, at the called mobile station unlocks the called station so that the called station can answer. It should be further understood that, during the conversation, the mobile station's radio transmitter, such as 201, is on the air only while the person at the mobile station is speaking, and is off the air while he is listening to the calling station.

Upon termination of the conversation and the cradling of the handsets at the calling and called stations, the operator at the telephone office receives disconnect supervision in conventional manner and, accordingly, takes down the connecting plugs. At the called mobile station, such as 200, the equipment and circuits are restored; thus re-establishing the mobile station in the standby condition.

Referring now to Figures 2 and 3 disclosing the circuit details of one of the mobile stations (200), a description of the operation of this equipment will now be given. As previously explained, the tone impulses from transmitter 101 of the radio control station are converted into multiple operations of the "line" relays, such as 205, of all the mobile stations in the standby condition. The pulsing is received from the radio control station at mobile station 200 as alternate "splashes" of tone modulation of the incoming transmitter carrier at 600 and 1500 cycle frequencies respectively. These tone splashes (one for each dial impulse) are "plate" rectified in well-known manner by tone rectifier 204, the lower half of rectifier 204 rectifying the 600 cycle splashes, and the upper half the 1500 cycle splashes. The resulting direct currents flow through the lower winding of pulsing relay 205 responsive to the receipt of the 600 cycle splashes, and through the upper winding of relay 205 responsive to the receipt of the 1500 cycle splashes, relay 205 operating when either winding is energized.

Capacitators 237 and 238 are connected across the respective rectifier circuits to improve efficiency, i. e., to remove the effect of the load (relay 205) inductance by removing the AC component. Each rectifier circuit is completed through the respective winding of relay 205 to positive high voltage at radio receiver 202 by way of armature 236.

The detail operation of pulsing relay 205 is as follows: The two windings of relay 205 are connected differentially so that when current flows in either winding alone relay 205 operates, but current flows in both windings at the same time oppose each other magnetically and the operation of relay 205, therefore, cannot be maintained. Assuming now that the digit "3" is dialed by the operator at the telephone office, then the first received tone splash (corresponding to the first impulse of the dialed digit "3") is of 600 cycle frequency, and relay 205 accordingly operates through its lower winding. Just before this current flow through the lower winding ceases, the first tone splash of 1500 cycle frequency (corresponding to the second impulse of the dialed digit "3") is received, and a corresponding current flow is established through the upper winding of relay 205. There is, therefore, a momentary period in which currents flow through both windings of relay 205 at the same time, with the result that relay 205 is instantly "kicked down" (restored) due to the opposite magnetic influences of the two windings. Immediately following, the current flow through the lower winding of relay 205 ceases, and relay 205 accordingly re-operates responsive to the current flow through its upper winding. Relay 205 remains in the operated position until the receipt of the next tone splash which will be of 600 cycle frequency.

A cycle of conditions similar to that just outlined in the preceding paragraph occurs as the second tone splash of 600 cycle frequency (corresponding to the third impulse of the dialed digit "3") is received, and relay 205 again restores due to the second momentary magnetic oppositions of its two windings. Immediately following, the current flow through the upper winding of relay 205 ceases, and relay 205 accordingly re-operates a second time responsive to the second current flow through its lower winding. Finally, as a result of the ceasing of the second current flow through the lower winding of relay 205 (due to the completion of the dialing of the digit "3" and the disablement of the dialing circuit by the operator), relay 205 restores for the second and final time.

It is obvious from the explanations given in the two preceding paragraphs that the number of operations, restorations, re-operations and final restoration of pulsing relay 205 are dependent directly upon the values of the digits dialed. Tone splashes corresponding to odd-valued dialed impulses are always of 600 cycle frequency, and tone splashes corresponding to even-valued dialed impulses are always of 1500 cycle frequency.

Returning now to the explanation of the progress of an incoming call to mobile station 200, it is assumed that the telephone number of mobile station 200 is 57371 and that the operator is about to receive supervision as a signal to commence dialing this number.

After the operator plugged into jack 104 and just prior to the operator receiving the signal to commence dialing, the wipers of selector 305 are stepped from contacts #1 to contacts #2 of the respective bank levels, due to the first restoration of magnet 310, in the manner previously explained. Wiper 332 is of the well-known "bridging" type and, therefore, connects with its contact #2 a moment before it leaves contact #1. Hence, before magnet 310 has sufficient time to operate and open armature 309, a circuit for relay 315 is completed from ground, armature 211 and working contact, armature 233, conductor 224, armature 326, armature 322 and resting contact, wiper 332 in contact with contact #2, multiple straps to contact #25, armature 309, winding of relay 315 to battery. Relay 315 operates and, since it is of the slow-to-release type, it will not restore due to pulsing operations of magnet 310. At armature 316, relay 315 opens a point in the operating circuit of relay 320 thereby preventing a premature operation of relay 320. Relay 315 restores shortly after the first re-operation of magnet 310 which occurs as the wipers of selector 305 come to rest on the respective contacts #2.

The operator now receives the mentioned signal to commence dialing and she, therefore, dials 57371. The tone splashes, appearing as operations of pulsing relay 205, control the station selector 305 to identify the call as for mobile station 200 and to cause the signalling of mobile station 200. It should be understood at this time that the appearance of the carrier from radio transmitter 101 on the air responsive to the operator at the telephone office plugging into jack 104 of the radio channel caused the operation of a squelch circuit (not shown) in radio receiver 202 which in turn activated tube 209 thereby operating squelch relay 210. At armature 212, squelch relay 210 opened a point in the operating circuit of relay 230 thereby locking out station 200 for the time being.

The received first tone splash (600 cycle frequency) corresponding to the first impulse of the first dialed digit "5" causes the energization of the lower winding of pulsing relay 205 and, in the manner previously explained, relay 205 is kicked down a second time thereby to open the operating circuit of magnet 310 and cause magnet 310 to restore. The restoration of magnet 310 causes the wipers of selector 305 to be stepped from the respective contacts #2 to the respective contacts #3. The restoration of magnet 310 also completes the circuit to relay 315, causing relay 315 to operate, and since relay 315 is of the slow-to-release type, it will hold up during the remainder of the pulsing of the first dialed digit "5." Pulsing relay 205 again re-operates immediately following its second kickdown (due to the continuation of 600 cycle tone on the carrier from transmitter 101) and again completes the circuit of magnet 310 at armature 213, causing magnet 310 to re-operate a second time.

The received second tone splash (1500 cycle frequency) corresponding to the second impulse of the dialed digit "5" causes the energization of the upper winding of pulsing relay 205, and pulsing relay 205 is kicked down a third time thereby to open the operating circuit of magnet 310 and cause magnet 310 to again restore. This restoration of magnet 310 causes the wipers of selector 305 to be stepped from the contacts #3 to the contacts #4. This restoration of magnet 310 also again completes the circuit to relay 315, thereby giving relay 315 another energizing impulse and causing relay 315 to remain in the operated position. Pulsing relay 205 again re-operates immediately following its third kickdown (due to the continuation of 1500 cycle tone on the carrier from transmitter 101) and again completes the circuit of magnet 310 causing magnet 310 to re-operate a third time.

In a similar manner to the receipt of the first tone splash, the received third tone splash (corresponding to the third impulse of the dialed digit "5") causes pulsing relay 205 to be kicked down a fourth time, thereby to again open the operating circuit of magnet 310 and cause magnet 310 to again restore. This restoration of magnet 310 causes the wipers of selector 305 to be stepped from the contacts #4 to the contacts #5. This restoration of magnet 310 also again completes the circuit to relay 315, thereby giving relay 315 another energizing impulse and causing relay 315 to remain in the operated position. Pulsing relay 205 again re-operates immediately following its fourth kickdown (due to the continuation of 600 cycle tone on the carrier from transmitter 101) and again completes the circuit of magnet 310 at armature 213, causing magnet 310 to re-operate a fourth time.

The received fourth tone splash (corresponding to the fourth impulse of the dialed digit "5") causes pulsing relay 205 to be kicked down a fifth time, thereby to again open the operating circuit of magnet 310 and cause magnet 310 to again restore. This restoration of magnet 310 causes the wipers of selector 305 to be stepped from the contacts #5 to the contacts #6, and also again completes the circuit to relay 315. Pulsing relay 205 again re-operates immediately following its fifth kickdown (due to the continuation of 1500 cycle tone on the carrier from transmitter 101) and again completes the circuit of magnet 310 at armature 213, causing magnet 310 to re-operate a fifth time.

The received fifth tone splash (corresponding to the fifth impulse of the dialed digit "5") causes pulsing relay 205 to be kicked down a sixth time, thereby to again open the operating circuit to magnet 310 and cause magnet 310 to again restore. This restoration of magnet 310 causes the wipers of selector 305 to be stepped from the contacts #6 to the contacts #7, and also again completes the circuit to relay 315. Pulsing relay 205 again re-operates immediately following its sixth kickdown (due to the continuation of 600 cycle tone on the carrier from transmitter 101) and again completes the circuit of magnet 310 at armature 213, causing magnet 310 to re-operate a sixth time. Since the received fifth tone splash represents the fifth, or final, impulse of the dialed digit "5," relay 315 restores shortly after the sixth re-operation of magnet 310. The operating circuit to relay 320, however, remains open because wiper 333 is now resting on its contact #7 which contact is open and not connected to the multiple strapping to contact #23.

The dialing of the second digit "7" causes the further advancement of the wipers of selector 305 seven more steps in a manner similar to that just described for the dialing of the first digit "5" and, at the conclusion of the dialing of the second digit "7," the wipers are resting on the fourteenth contacts of the respective bank levels. Relay 315 re-operates responsive to the seven kickdown of pulsing relay 205 and remains operated until the dialing of the digit "7" has been completed whereupon it restores shortly thereafter. Wiper 333, however, is resting on its open contact #14 and, therefore, relay 320 cannot operate at this time.

Similarly, the dialing of the third digit "3" causes the further advancement of the wipers of selector 305 three more steps to the respective contacts #17: the dialing of the fourth digit "7" causes the further advancement of the wipers seven more steps to the respective contacts #24; and the dialing of the fifth (final) digit "1" causes the further advancement of the wipers to the respective contacts #25.

Shortly after the wipers of selector 305 come to rest on the contacts #25 of the respective bank levels, relay 315 restores and thereby completes a multiple circuit to call buzzer 304 and relay 325, causing buzzer 304 to sound as an audible signal that station 200 is being called. This multiple circuit may be traced from ground, armature 211 and working contact, armature 233, conductor 224, armatures 316, 321, wiper 333, bank contact #25 call buzzer 304 to battery, and from bank contact #25 through resting contact of armature 327, winding of relay 325 to battery. Relay 325 operates and locks to ground by way of armature 234, conductor 226, and armature 327 and working contact.

At armature 329, relay 325 completes an obvious circuit to call lamp 307, thereby providing a visual indication that a call has been received. At armature 328, relay 325 prepares an operating circuit for relay 230 independent of relay 210, thereby unlocking station 200. At armature 326, relay 325 opens a point in the closed circuit to busy lamp 308 but the circuit to busy lamp 308 is maintained through wiper 334 for the time period that wiper 334 rests on contact #25 of its bank level.

Pulsing relay 205 immediately re-operates upon the completion of the dialing of the final digit "1" (due to the continuation of 600 cycle tone on the carrier of transmitter 101) and again completes the circuit of magnet 310 at armature 213 through wiper 334 resting on contact #25, causing magnet 310 to again re-operate. At armature 309, magnet 310 opens the circuit of relay 315 and relay 315 restores shortly thereafter.

Approximately two seconds after the completion of the dialing of call number 57371 of mobile station 200, an extra tone splash (in this instance of 1500 cycle frequency) is received by radio receiver 202 from transmitter 101 of the radio control station. This additional tone splash causes a final kickdown of pulsing relay 205 (in a manner previously explained), thereby causing magnet 310 to restore and effect the advancing of the wipers of selector 305 one more step. The wipers, therefore, leaves the respective contacts #25 and connect with the respective contact #1. As wiper 333 left its contact #25, it opened the operating circuit to call buzzer 304 but call lamp 307 glows continuously because relay 325 is locked up independent of any action of selector 305. The call remains in this position until the person at mobile station 200 answers or the operator at the telephone office abandons the call.

Assuming further that the person at mobile station 200 answers the call by lifting handset 301 from the cradle, then relay 230 operates over the circuit from ground, cradle switch 302, armature 328, conductor 227, winding of relay 230 to battery and locks to the ground on conductor 228 by way of armature 235. At armature 233, relay 230 disconnects ground from conductor 224: at armature 234, disconnects ground from conductor 226 thereby to unlock relay 325 and cause relay 325 to restore thereby to darken call lamp 307; and, at armature 236, further disables pulsing relay 205 and tone rectifier 204, it being understood that the operator at the telephone office caused the removal of continuous tone from the carrier of transmitter 101 by disabling the dialing circuit after completing the dialing.

At armature 232, relay 230 prepares a point in the incoming listening circuit to handset 301 and, at armature 231, prepares a point in the multiple operating circuit to TL relay 207 and power relay 220. When the person at mobile station 200 presses TL button 312 of handset 301 to acknowledge the incoming call, the mentioned partly prepared multiple circuit to TL relay 207 and power relay 220 is completed. TL relay 207, therefore, operates to switch the antenna from radio receiver 202 to radio transmitter 201, and power relay 220 operates to supply transmission battery to the transmitter of handset 301 by way of contactors 216, 221 and ground. The person at mobile station 200 talks over conductor 217 and ground through the input circuit of radio transmitter 201 while TL button 312 is depressed, and listens over conductor 219 and ground from the output circuit of radio receiver 202 when TL button 312 is released, it being understood that radio transmitter 201 is on the air while the person at mobile station 200 is talking and that radio receiver 202 is on the air while that person is listening.

It should also be understood at this time that squelch relay 210 at mobile station 200 restores each time radio receiver 202 is switched from the antenna, and re-operates each time radio receiver 202 is switched back to the antenna. At all the mobile stations in the standby condition, the related squelch relays operate when the respective radio receivers pick up the carrier from transmitter 101 of the radio control station, and remain in the operated positions for the duration of the call.

Upon the termination of this conversation, the operator at the telephone office causes the disconnection in well-known manner, whereupon transmitter 101 of the radio control station is removed from the air. As a consequence, squelch relay 210 is restored for the final time. Responsive to the cradling of handset 301 at mobile station 200, cradle switch 302 disconnects ground from conductor 228 thereby causing relay 230 to restore. An armature 231, relay 230 opens a point in the multiple circuit of TL relay 207 and power relay 220: at armature 232, opens a point in the listening circuit of handset 301: at armature 233, prepares a point in the circuit to conductor 224; at armature 234, prepares a point in the incomplete locking circuit to relay 325; and, at armature 236, prepares a point in the positive high voltage circuit to pulsing relay 205 and tone rectifier 204.

Considering now the case where mobile station 200 is not the station dialed by the operator at the telephone office, then one of the dialed digits will cause wiper 333 of station selector 305 to come to rest on a contact which is not open but is connected by multiple strapping to contact #23 of the bank level. As a consequence, relay 320 operates over the circuit from ground, armature 211 and working contact, armature 233, conductor 224, armatures 316, 321, wiper 333, bank contact on which wiper 333 is now resting, multiple strapping to contact #23 of the bank level, winding of relay 320 to battery.

Relay 320 locks to ground on conductor 224 by way of armature 322 and working contact, and armature 326 before the circuit to wiper 333 is opened at armature 321. Armature 213 of pulsing relay 205 is now disconnected from conductor 224 at the resting contact of armature 322 and, therefore, the wipers of selector 305 remain on the contacts of the bank levels they are now resting on for the balance of the call, since the pulsing circuit to magnet 310 is disabled. Busy pilot lamp 308 glows as an indication that the radio channel is in use (busy), the circuit for lamp 308 being traced from ground, armature 211 and working contact, armature 233, conductor 224, armature 326, busy lamp 308 to battery. Station 200 is locked out at armature 212 of squelch relay 210, thereby preventing "break in" should the person at station 200 lift handset 301 from the cradle.

Upon the conclusion of the call in which mobile station 200 is not the dialed station, disconnection by the operator at the telephone office results in the restoration of squelch relay 210 in well-known manner. At armature 211 and resting contact, restored squelch relay 210 completes a "homing" circuit for selector 305 by way of conductor 222, wiper 331, bank contact on which wiper 331 is now resting, multiple strapping to contact #25 of the bank level, interrupter spring 311, winding of magnet 310 to battery. Magnet 310 "self-drives" the wipers of selector 305 in well-known manner until the wipers arrive at the respective contacts #1, whereupon the homing circuit to magnet 310 is open at contact #1 of wiper 331 bank level. Wiper 311 is of the well-known "bridging" type and, therefore, connects with the next bank contact in line a moment before it leaves the preceding bank contact. The homing circuit to magnet 310 is, consequently, kept continuous through the bank level as wiper 331 is stepped towards and arrives at contact #25 of its bank level. Relay 320 restored when its locking circuit was opened at the working contact of armature 211. The circuit to busy pilot lamp 308 was also opened at the working contact of armature 211. Mobile station 200 is now in the normal standby condition.

It should be understood at this time that while this present preferred embodiment of the invention includes the arrangement whereby pulsing relay 205 is kicked down responsive to a momentary simultaneous occurrence of current in both of its windings due to a slight overlap of two consecutive tone splashes incoming to radio receiver 202, it is not essential that the received tone splashes overlap. Pulsing relay 205 will restore even though there is a slight gap between two consecutive received tone splashes because before the magnetic effect of one winding of pulsing relay 205 decays sufficiently to alone cause the restoration of pulsing relay 205, current is established in the other winding to cause a neutralizing magnetic effect. Magnetic decay resulting from a discontinuance of current in either winding of pulsing relay 205 is further delayed by the disclosed arrangement wherein a capacitor (237 or 238) is bridged across each winding of pulsing relay 205. It is also unnecessary that non-overlapping tone splashes be sufficiently close together to cause kickdowns of pulsing relay 205, because pulsing relay 205 will restore due to the opening of one winding alone and provide an ample minimum break of armature 213 for causing accurate stepping of station selector 305. It is, therefore, immaterial whether pulsing relay 205 is kicked down due to the neutralizing effect of the two windings or restored due to the opening of one winding alone, or to a composite of the two described release restoring conditions.

*Outgoing call from a mobile station to a telephone office fixed station*

On an outgoing call from a mobile station, such as station 200, to the telephone office, the person at the calling mobile station first observes that the radio circuit busy pilot lamp 308 is not glowing, and then removes handset 301 from the cradle. Lifting handset 301 causes ground to be connected to the armature spring of cradle switch 302 thereby to operate relay 230 by way of conductor 228, armatures 246, 212, winding of relay 230 to battery. Relay 230 locks to the ground on conductor 228 by way of armature 235.

At armature 231, relay 230 prepares a point in the multiple circuit to TL relay 207 and power relay 220: at armature 232, prepares a point in the incoming listening circuit to the telephone receiver of handset 301: at armature 233, opens a point in the pulsing circuit to magnet 310 of station selector 305; and, at armature 236, disconnects positive high voltage from pulsing relay 205 and rectifier 204.

The person at mobile station 200 then presses TL button 312 for several seconds to cause the signalling of the operator at the telephone office. Responsive to the pressing of TL button 312, TL relay 207 and power relay 220 operate in multiple over the circuit from ground, working contact of the switch inside the handle of handset 301, conductor 218, armature 231, windings of TL relay 207 and power relay 220 in multiple to battery. At armature 208 and working contact, TL relay 207 switches the antenna from radio receiver 202 in radio transmitter 201 thereby to place the carrier of transmitter 201 on the air. At contactor 221, power relay 220, supplies transmission battery to the transmitter of handset 301 over conductor 217 and ground. At the radio control station, the reception of the carrier from radio transmitter 201 of mobile station 200 causes the operator at the telephone office to be signalled in well-known manner.

The operator at the telephone office answers the call by plugging into jack 104 associated with the radio channel, and acknowledges the call in the usual manner. The person at mobile station 200 releases TL button 312 to listen for the operator's acknowledgment, and presses TL button 312 to talk to the operator.

The plugging into jack 104 at the telephone office causes radio transmitter 101 of the radio control station to place its carrier on the air in well-known manner. Reception of the carrier of transmitter 101 simultaneously by the radio receivers of all mobile stations in the standby condition (excepting calling station 200) causes the operations of the related squelch relays 210) to lock out all the mobile stations in the standby condition (excepting calling station 200) in the manner previously explained in the section titled "Incoming Call to a Mobile Station." These "lock outs" are evidenced at the mobile stations in the standby condition by the glowing of the respective busy pilot lamps, such as 308. At the calling mobile station 200, squelch relay 210 correspondingly operates but cannot lock out station 200 as relay 230 is already in the locked up condition. Next, the person at mobile station 200 requests connection to a telephone fixedly connected to the telephone office, and the desired connection is established in well-known manner. When the called station answers, conversation takes place, the person at mobile station 200 pressing TL button 312 to talk and releasing TL button 312 to listen.

Upon the termination of the conversation, the operator at the telephone office causes the disconnection in well-known manner, whereupon transmitter 101 of the radio control station is removed from the air. As a consequence, all of the squelch relays (210) at the mobile stations are restored. Responsive to the cradling of handset 301 at mobile station 200, cradle switch 302 disconnects ground from conductor 228 thereby to restore station 200 to the standby condition in the manner previously explained in the section titled "Incoming Call to a Mobile Station."

*Mobile station "eavesdropping"*

In order to prevent "eavesdropping" on an established call by a mobile station in the standby condition (such an established call being evidenced at all mobile stations in the standby condition by the glowing of the respective busy pilot lamps, such as 308), thermal relay 240 and its slave relay 245 are incorporated in the control circuit of each mobile station. Thermal relay 240 is of the slow-to-operate type, requiring that approximately 20 seconds of time elapse after its circuit is energized before it will operate.

Responsive to the operation of master "on"–"off" switch 303 to place mobile station 200 in the standby condition, the circuit to thermal relay 240 is completed by way of armature 248. Approximately 20 seconds thereafter, thermal relay 240 operates and, at armature 241, completes an obvious circuit to relay 245. Relay 245 accordingly operates and locks to ground by way of armature 247 and working contact. At armature 248, relay 245 opens the circuit to thermal relay 240, causing relay 240 to restore. At armature 246, relay 245 closes a point in an operating circuit to relay 230, the only remaining open point in that circuit being the open contact of cradle switch 302.

Assuming now that a connection has been established to or from a mobile station other than station 200, and that the person at station 200 upon noticing that the busy pilot lamp 308 is glowing to indicate the mentioned established connection, decides to attempt eavesdropping on the established connection. He makes the attempt by first lifting handset 301 from the cradle and applying the receiver of handset 301 to his ear. It should be understood at this time that squelch relay 210 operated at the time the carrier from transmitter 101 was received by radio receiver 202 of station 200 and, at armature 212, opened a point in the mentioned operating circuit of relay 230, thereby locking out station 200. The person at station 200, therefore, cannot eavesdrop on the mentioned established connection by merely lifting handset 301 and listening.

The person at station 200 next moves master "on"–"off" switch 303 to the "off" position. Responsive to the disconnecting of ground from conductor 229 at master switch 303, power relay 215 in radio transmitter 201 restores and, at contactor 216, disconnects battery from the battery commons of the various equipment units of station 200. Relay 245, therefore, restores and, at armature 246, opens a point in the operating circuit from cradle switch 302 to relay 230. Squelch relay 210 also restores and, at armature 212, prepares a point in the operating circuit from cradle switch 302, but this closure is ineffective because of the opening at armature 246. Hence, station 200 remains locked out even though handset 301 is off the cradle switch and master switch 303 in the "off" position.

After a moment or two, the person restores master switch 303 to the "on" position, still retaining handset 301 off the cradle switch. Responsive to the restoring of master switch 303 to the "on" position, power relay 215 operates and, at contactor 216, re-connects battery to the battery commons of the equipment. The circuit of thermal relay 240 is now complete and, after approximately 20 seconds, relay 240 re-operates to cause the re-operation and locking of relay 245. At armature 246, relay 245 closes a point in the operating circuit of relay 230 but this closure does not occur for approximately 20 seconds. Squelch relay 210, however, re-operated immediately power relay 215 returned battery to the battery commons and, therefore, squelch relay 210 opened its armature 212 long before relay 245 closes armature 246. Mobile station 200, consequently, remains locked out, and the attempted eavesdrop is ineffective.

It should also be understood that the 20-second delay in the operation of thermal relay 240 specified in this section of the specification is not necessarily an inflexible condition, as any desired time delay in the operation of relay 240 can be established. It should be further understood that the invention is not limited to the employment of a thermal type relay such as 240, for the accomplishment of locking out a mobile station against eavesdropping, as any suitable well-known time delay arrangement may be used instead.

*Calls from one mobile station to another mobile station*

Assuming now that the person at mobile station 200 desires a connection with another mobile station on the same carrier frequency, then the call is initiated at mobile station 200 and answered by the operator at the telephone office, in the manner described in the section titled "Outgoing Call From a Mobile Station to a Telephone Office Fixed Station."

The operator at the telephone office answering this call and learning that it is for another mobile station on the same carrier frequency, requests the person at station 200 to "stand by" without returning handset 301 to the cradle while she sets up the desired connection. The operator then causes disconnect by taking down the plug connection to jack 104. In the meantime, the person at station 200 is "standing by," with the telephone receiver of handset 301 to his ear. Under these conditions, squelch relay 210 is in the restored position, and relay 230 is locked to the ground supplied by cradle switch 302 over conductor 228.

Next, the operator at the telephone office initiates a call by replugging into jack 104 and dials the call number of the wanted mobile station, in the manner described in the section titled Incoming Call to a Mobile Station. Since mobile station 200 is not the station dialed by the operator, and since the person at station 200 has relay 230 locked to the ground supplied by cradle switch 302, the re-operation of squelch relay 210 cannot lock out station 200. The waiting person at station 200 is, therefore, in a position to hear the tone pulses as they are sent out from the radio control station, and to hear when the dialed station answers the call.

Assuming further that the dialed mobile station answers the call, then conversation proceeds between station 200 and the dial mobile station. The person at each of these two stations presses the TL button in his telephone handset to talk to the other person, and releases the TL button to listen. The operator at the telephone office leaves jack 104 plugged up during the conversation period between the two mobile stations, to permit monitoring and to keep transmitter 101 of the radio control station on the air since transmitter 101 transmits the speech from each mobile station person to the other mobile station person, i. e., the conversation between the two mobile stations loops through the radio control station.

During the conversation period between the two mobile stations, the circuit conditions at mobile station 200 are the same as described in the section titled "Outgoing Call From a Mobile Station to a Telephone Office Fixed Station," and the circuit conditions at the dialed mobile station are the same as described in the section titled "Incoming Call to a Mobile Station" for the mobile station represented by the call number 57371.

When the operator at the telephone office determines that the conversation between mobile station 200 and the dialed mobile station has been terminated, the operator provides disconnect by removing the plug from jack 104. Responsive to the withdrawal of the plug from jack 104, transmitter 101 is removed from the air thereby to cause the restoration of the squelch relays at the mobile stations. The cradling of the respective telephone handsets at mobile station 200 and the dialed mobile station unlock the respective 230 relays thereby to restore the respective stations to the standby condition.

*False signalling of a mobile station*

In connection with any call initiated at any of the mobile stations of the radio channel, the circuits of the station selector motor magnets, and as 310, of the other mobile stations in the standby condition associated with the radio channel become partly prepared by the operations of the related squelch relays, such as 210, and the related pulse receivers, such as 242 and 243, the tone rectifiers, such as 204, and the pulsing (line) relays such as 205, are all in the active standby condition. As a consequence, any of the mobile stations in the standby condition may receive stray pulses over the respective radio receiver, such as 202, and if such stray pulses are of proper frequency and magnitude, the partly prepared circuit of the station selector motor magnet, such as 310, would be accordingly closed and interrupted with the result that the wipers of the station selector would be stepped over the related bank contacts. If such stray pulses are sufficient in number during an established conversation, the wipers of the station selector of the mobile station in the standby condition would be stepped to the respective bank contacts #25 and, unless preventive measures are introduced, the related call buzzer, such as 304, and the call pilot lamp, such as 307 would be falsely activated. The circuits at the mobile stations, such as 200, are, therefore, arranged to prevent such false signalling in the following described manner.

Assuming now that mobile station 200 is in the standby condition at a time when another mobile station associated with the radio channel has established a telephone connection, and that stray pulses of proper frequency and magnitude are received over radio receiver 202, then pulsing relay 205 is operated and interrupted in a manner similar to that described in the section titled "Incoming Call to a Mobile Station." The first operation of pulsing relay 205 completes the circuit of magnet 310 from ground, armature 211 and working contact (squelch relay 210 operated responsive to the placing of the radio control station carrier on the air), armature 233, conductor 224, armature 326, armature 322 and resting contact, conductor 225, armature 213, conductor 223, winding of magnet 310 to battery, causing magnet 310 to operate. The operation of magnet 310 causes the positioning of its pawl in well-known manner preparatory to stepping the wipers of station selector 305. The subsequent restoration of magnet 310 causes the wipers of selector 305 to be stepped from contacts #1 of the respective bank levels to contacts #2 in well-known manner.

Wiper 332 of station selector 305 is of the well-known "bridging" type and, therefore, connects with its contact # 2 a moment before it leaves contact #1. Hence, even though magnet 310 should be immediately re-energized following its first restoration, a multiple circuit to relay 315 and thermal relay 240 is completed before magnet 310 would have sufficient time to re-operate and open the mentioned multiple circuit at armature 309. This multiple circuit may be traced from ground, armature 211 and working contact, armature 233, conductor 224, armature 326, armature 322 and resting contact, wiper 332 in contact with contact #2, multiple straps to contact #25, armature 309, winding of relay 315 to battery, and from armature 309, conductor 249, winding of thermal relay 240 to battery. Relay 315 operates immediately and, since it is of the slow-to-release type, it will not restore should an immediately consecutive series of interruptions be made in the circuit of magnet 310. Thermal relay 240, however, does not operate immediately its circuit is completed but requires a time lapse of at least 20 seconds after the circuit is completed before it will operate.

Assuming now that a first operation and a first restoration of magnet 310 has completed the circuit to thermal relay 240 through wiper 332 and contact #2 of the related bank level, and that no further pulsing of magnet 310 occurs before the ineffective operating time (approximately 20 seconds) of thermal relay 240 has expired, then thermal relay 240 operates after the ineffective operating time has expired. At armature 241, thermal relay 240 completes an obvious circuit to relay 230, causing relay 230 to operate. At armature 233, relay 230 disables the operating circuit of magnet 310; and, at armature 236, disables pulsing relay 205 and tone rectifier 204. Any additional stray pulses received over radio receiver 202, therefore, cannot cause further stepping of station selector 305, the wipers of selector 305 resting on the respective #2 bank contacts for the duration of the mentioned established conversation. Mobile station 200, consequently, cannot be falsely signalled at this time.

One possible source of stray pulses which can be received over a radio receiver, such as 202, of a mobile station in the standby condition is the voice currents on a telephone connection initiated by a mobile station of the radio channel. If the voice levels of the prevailing conversation are of sufficient magnitude, the pulsing relay, such as 205, of a mobile station in the standby condition would be occasionally pulsed on the peaks, unless the pulsing circuits of the mobile station in the standby condition are disabled by the just described serial operation of thermal relay 240 and relay 230.

Considering now the case where wiper 332 of station selector 305 is resting on its #2 bank contact and has completed the operating circuit to thermal relay 240 in the manner just described, and that before sufficient ineffective operating time has lapsed to permit thermal relay 240 to operate, another effective stray pulse is received over radio receiver 202. Responsive to the receipt of the second effective stray pulse before thermal relay 240 has had sufficient time to operate and disable the pulsing circuits of mobile station 200, magnet 310 is again energized and restored. The wipers of station selector 305 are, therefore, correspondingly advanced from the respective #2 bank contacts to the respective #3 bank contacts.

Upon the second operation of magnet 310, the circuit to thermal relay 240 previously completed through wiper 332 and associated bank contact #2 is opened at armature 309, but is again closed at armature 309 as magnet 310 restores upon the conclusion of the received second effective stray pulse. Thermal relay 240 will have not had sufficient time to operate before the second effective stray pulse is received, but some of the ineffective operating time will have lapsed before the second effective stray pulse is received and, therefore, thermal relay 240 will have been heated a corresponding extent. As a consequence, the full ineffective operating time of thermal relay 240 will not be required to lapse after the second effective stray pulse has been concluded before thermal relay 240 can operate and disable the pulsing circuits of mobile station 200. Assuming further that thermal relay 240 operates before a third effective stray pulse is received over radio receiver 202, then the pulsing circuits of station 200 are opened at armatures 233 and 236 in the manner previously described.

Should a third effective stray pulse be received over radio receiver 202 before thermal relay 240 has had sufficient time to operate and disable the pulsing circuits of station 200, then the wipers of station selector 305 would be advanced from the respective #3 bank contacts to the respective #4 bank contacts. Upon the conclusion of the received third effective stray pulse, thermal relay 240 will require a correspondingly lesser ineffective operating time to lapse before it can operate to disable the mentioned pulsing circuits. If this correspondingly lesser ineffective operating time does not expire before a fourth effective stray pulse is received, then thermal relay 240 cannot operate, and the wipers of station selector 305 will be advanced from the respective #4 bank contacts to the respective #5 bank contacts.

In like manner, other additional effective stray pulses could be received over radio receiver 202 to further step the wipers of station selector 305 along the respective bank levels, with the ineffective operating time limit of thermal relay 240 being correspondingly reduced until thermal relay 240 will operate upon the conclusion of one of such additional effective stray pulses to disable the pulsing circuits of station 200. Since contacts #2 to #25 inclusive of the bank level associated with wiper 332 are multipled together, the wipers of station selector 305 can be stopped and held on any set of bank contacts from #2 upwards. Effective stray pulses ordinarily will not be received in immediately consecutive series because such pulses are developed by conditions occurring only occasionally in the progress of a telephone conversation over the radio channel and, therefore, thermal relay 240 will operate to disable the pulsing circuits of station 200 before the wipers of station selector 305 reach the signalling position (position 25). Thermal relay 240 will remain operated through armature 309 since magnet 310 cannot now re-operate.

Having described the invention, what is considered new and is desired to have protected by Letters Patent is set forth in the appended claims:

1. In a radio telephone system, a station including a radio receiver, and a selector movable in only one direction, said selector having only one home position, a signal position and other positions, means for stepping said selector in said one direction, means for transmitting pulses over said radio receiver, means responsive to said transmitted pulses corresponding to the call number of said station for operating said stepping means to step said selector in said one direction from said one home position to said signal position, said selector thereafter remaining in said signal position, means for thereafter transmitting an additional pulse over said radio receiver while said selector is remaining in said signal position, said operating means responsive to the receipt of said additional pulse for operating said stepping means to step said selector in said one direction from said signal position to said one home position, said operating means responsive to said first mentioned transmitted pulses not corresponding to the call number of said station for operating said stepping means to step said selector in said one direction from said one home position to one of said other positions, and means for automatically operating said stepping means to step said selector in said one direction from said one other position to said one home position.

2. In a radio telephone system, a station having a radio receiver, a listening circuit connected to said receiver, a telephone, means for connecting said telephone to said listening circuit, an incomplete circuit for controlling said connecting means, a switching key, a control relay, a lockout relay and a relay having a slow-to-operate characteristic, means responsive to said station operating said key for operating said control relay to close one point in said incomplete controlling circuit thereby to partially complete said controlling circuit, means responsive to a received signal over said receiver for operating said lockout relay to open another point in said control circuit thereby to continue said incompleteness of said control circuit, means responsive to said station initiating a call for closing a different point in said control circuit to partially complete said control circuit, means responsive to said station thereafter restoring said operated key for causing said operated control and lockout relays to restore, means responsive to said restoration of said control relay for energizing said slow-to-operate relay, said energized slow-to-operate relay operating only after the lapse of a predetermined period of time due to its slow-to-operate characteristic, said restoration of said control relay also opening said one closed point in said control circuit to continue said incompleteness of said control circuit, said restoration of said lockout relay closing said opened other point in said control circuit to partially complete said control circuit, means responsive to said station operating said restored key before said energized slow-to-operate relay has had sufficient time to operate for re-operating said restored lockout relay to re-open said closed other point in said control circuit thereby to continue said incompleteness of said control circuit, and means for reoperating said restored control relay in response to the delayed operation of said slow-to-operate relay occuring after said re-operation of said lockout relay, said reoperation of said control relay reclosing said one opened point in said control circuit to partially complete said control circuit, said re-opening of said other point in said control circuit continuing said incompleteness of said control circuit to prevent said station from causing said telephone to be connected to said listening circuit.

3. In a radio telephone system, stations each including a radio receiver, a signal, a selector movable in only one direction, and means for stepping said selector in said one direction, each said selector having only one home position, a signal position, and non-signal, positions, means for transmitting pulses corresponding to the call number of one of said stations over said radio receivers, means at said one station responsive to the receipt of said pulses over said radio receiver of said one station for operating said stepping means of said one station to step said selector of said one station in said one direction from its home position to its signal position, means responsive to said one selector reaching its signal position for activating the signal of said one station to indicate that said one station is being called, means at said other stations responsive to the receipt of said pulses over said respective radio receivers of said other stations for operating the respective stepping means of said other stations to step said selectors of said other stations from the respective home positions to respective non-signal positions, means at said other stations responsive to said selectors of said other stations reaching said respective non-signal positions for holding said stepped selectors of said other stations in said respective non-signal positions, means for thereafter transmitting an additional pulse over said radio receivers while the selectors at the stations are out of their home positions, said operating means of said one station responsive to the receipt of said additional pulse over said receiver of said one station for operating said stepping means of said one station to step said selector of said one station from its signal position to its home position in said one direction.

4. The radio telephone system claimed in claim 3, together with means for releasing said call to said one station, and means at said other stations responsive to said release of said call and controlled over said respective radio receivers of said other stations for operating the respective stepping means of said other stations to step said held selectors of said other stations in said one direction from the respective non-signal positions to the respective home positions.

5. A system such as described in claim 4, in which each station has a telephone handset, means for activating said handset if said signal is activated, a relay, and a circuit completed for energizing said relay by each of said held selectors, and means operated by said relay if operated for preventing the operation of said means for activating said handset.

6. A system such as claimed in claim 5, in which each station includes a manually operated switch for activating said radio receiver for thereby receiving a carrier frequency, means operated by said carrier frequency and said manually operated switch for preventing the activation of said handset, means operated on the receipt of pulses over said radio receiver corresponding to the call number of a particular station for disabling said last preventing means to thereby allow said handset to be activated.

7. In a radio telephone system, a station including a radio receiver for receiving pulses, a signal, and a selector movable in only one direction, said selector having only one home position and a signal position, means moving said selector in said one direction, means responsive to pulses received over said radio receiver corresponding to the call number of said station for operating said moving means to move said selector in said one direction from said one home position to said signal position, means responsive to said selector reaching said signal position for activating said signal to signal said station, said selector thereafter remaining in said signal position, said operating means responsive to a pulse received over said radio receiver while said selector is standing in said signal position for again operating said moving means, said last mentioned operation of said moving means moving said selector in said one direction from said signal position to said one home position.

References Cited in the file of this patent

UNITED STATES PATENTS

| Number | Name | Date |
|---|---|---|
| 1,182,932 | Schnerre | May 16, 1916 |
| 1,662,877 | Almquist | Mar. 20, 1928 |
| 1,815,045 | Boddie et al. | July 21, 1931 |
| 1,900,499 | Hershey | Mar. 7, 1933 |
| 2,063,354 | Thorp | Dec. 8, 1936 |
| 2,064,958 | Taylor | Dec. 22, 1936 |
| 2,223,049 | Reichle | Nov. 26, 1940 |
| 2,241,157 | Powell | May 6, 1941 |
| 2,276,122 | Tull | Mar. 10, 1942 |
| 2,289,794 | Martin | July 14, 1942 |
| 2,293,869 | Vaughn | Aug. 25, 1942 |
| 2,297,618 | Grimes et al. | Sept. 29, 1942 |
| 2,365,284 | McClelland | Dec. 19, 1944 |
| 2,379,631 | Finckh | July 3, 1945 |
| 2,425,495 | Treyor | Aug. 12, 1947 |
| 2,457,149 | Herbst | Dec. 28, 1948 |
| 2,458,558 | Bradley | Jan. 11, 1949 |
| 2,469,555 | Hitchcock | May 10, 1949 |
| 2,478,361 | Bargelink | Aug. 9, 1949 |
| 2,483,445 | Tally | Oct. 4, 1949 |
| 2,486,100 | Beak et al. | Oct. 25, 1949 |
| 2,490,061 | Jensen | Dec. 6, 1949 |
| 2,543,608 | Stamper | Feb. 27, 1951 |

FOREIGN PATENTS

| Number | Country | Date |
|---|---|---|
| 489,609 | Great Britain | Oct. 19, 1937 |
| 570,415 | Great Britain | July 5, 1945 |
| 586,182 | Great Britain | Mar. 10, 1947 |